United States Patent

Carlson et al.

[15] 3,672,600

[45] June 27, 1972

[54] REEL-TO-REEL TAPE STORAGE APPARATUS

[72] Inventors: Robert A. Carlson, 230 Newton Road, Plainview, N.Y. 11803; Thomas P. Foley, 12 Janes Lane, Huntington, N.Y. 11743

[22] Filed: April 2, 1969

[21] Appl. No.: 812,767

[52] U.S. Cl. ..........................242/186, 242/75.51, 242/190, 242/201, 318/6

[51] Int. Cl. ................B65h 25/04, B65h 25/22, G11b 15/48

[58] Field of Search..................242/186, 187, 188, 189, 190, 242/191, 201, 202, 206, 207, 208, 209, 210, 75.51; 318/6, 7

[56] References Cited

UNITED STATES PATENTS

| | | | |
|---|---|---|---|
| 2,777,964 | 1/1957 | Di Mino | 242/75.51 X |
| 2,854,197 | 9/1958 | MacNeill | 242/190 |
| 3,297,266 | 1/1967 | Rumple | 242/186 |
| 3,302,900 | 2/1967 | Messamer | 242/185 |
| 3,488,696 | 1/1970 | Klang | 242/190 |

FOREIGN PATENTS OR APPLICATIONS

| | | | |
|---|---|---|---|
| 1,021,221 | 3/1966 | Great Britain | 242/190 |

*Primary Examiner*—George F. Mautz
*Attorney*—Darby & Darby

[57] ABSTRACT

The disclosure describes an information tape storage apparatus without tape loop storage means or tape driving means interposed along the path of the tape as the tape moves from the information processing station to the take-up reel. To provide such tape motion, including the usual start-stop characteristics, a tachometer generates a signal indicative of tape speed which is compared differentially with a ramp signal to develop a control signal for a low inertia printed circuit motor that is connected to turn the take-up reel.

3 Claims, 4 Drawing Figures

REEL-TO-REEL TAPE STORAGE APPARATUS

The present invention, generally, relates to information tape storage apparatus of the type used with computers or the central processer units of computers and, more particularly, to a reel-to-reel tape storage apparatus without tape loop storage means or tape driving means interposed along the path of the tape as the tape moves from one reel to the other.

It has been recognized that in reel type tape storage apparatus it is the large and varying inertias and the varying geometric conditions of the reels that complicate efforts to run tape at substantially constant tension, particularly during periods of rapid acceleration and deceleration and also to run at constant predetermined speeds. In the past, such controlled tape movement has been accomplished by a pinch roller mechanism that can be constructed with both a low inertia and a small time constant, permitting tape movement up to a desired speed in as short a time as 3 milliseconds. Such a mechanism provides the desired acceleration rate, but control of tape tension has required either multiple loop tension arms or vacuum tanks, or a combination of the two, which isolate the tape supply reel and the tape take-up reel from each other and from the length of tape that is being moved past the information processing station.

More recent developments have provided the single capstan tape drive mechanism, but with this mechanism, some form of temporary tape loop storage means is still required to isolate that portion of the tape at the information processing station from both reels. Still to date there has been no development that has obsoleted the pinch roller mechanism, the single capstan tape driver, multiple loop tension arms or vacuum tanks, until the present invention.

It is an object of the present invention to provide a new and improved information tape storage apparatus for moving tape, or any other elongated, web-like substance, from one reel directly to another reel without intervening tape loop storage means to maintain substantially constant tension in that portion of the tape at an information processing station.

It is also an object of the present invention to provide an information tape storage apparatus for moving tape from a supply reel directly to a take-up reel without the use of a drive capstan or pinch roller.

It is also an object of this invention to provide a means of accelerating and decelerating a varying inertial and geometric load to a predetermined speed at a predetermined rate.

Briefly, a reel-to-reel information tape storage apparatus constructed in accordance with the principles of the present invention includes at least two tape storage reels supported rotatably in a predetermined, spaced-apart pattern with an information processing station interposed between the two reels. A tape guide means, such as one or more rollers or guide posts, direct the tape past the information processing station in information transferring relationship as the tape is moved from one tape storage reel directly to the other reel without intervening tape loop storage means or tape driving means.

These and other objects and advantages of the present invention will become more readily apparent from the following more detailed description of the presently preferred form of the invention, taken together with the accompanying drawings. It is to be understood, however, that the drawings and the following detailed description are for the purpose of illustration only and are not to be construed as defining limits of the scope of the invention. Reference is to be had to the appended claims for that purpose.

Figure 3:
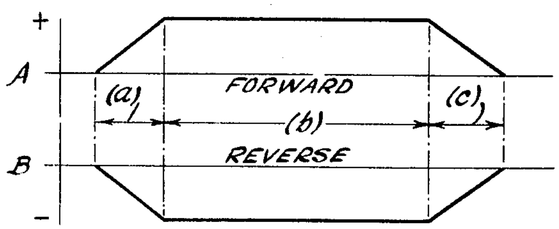

FIG. 3, A and B, shows curves of the "starting characteristics" of the apparatus of the invention as it accelerates from stand-still in a forward direction (curve A) and in a reverse direction (curve B), achieves constant speed, and then decelerates in substantially the same time interval as it accelerated.

Figure 4:
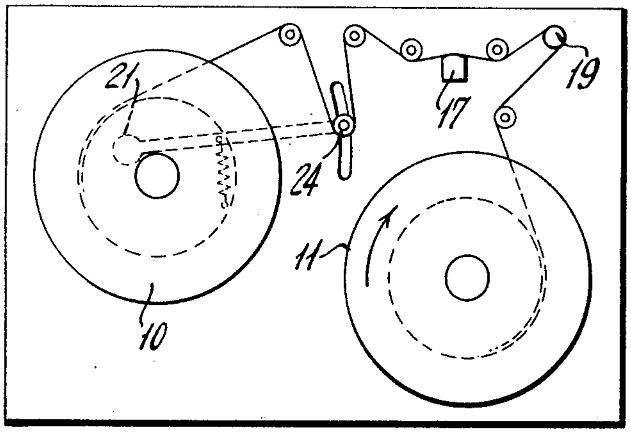

FIG. 4 shows a front panel view of a reel-to-reel information tape storage apparatus with the various component parts in a presently preferred arrangement.

Figure 1:
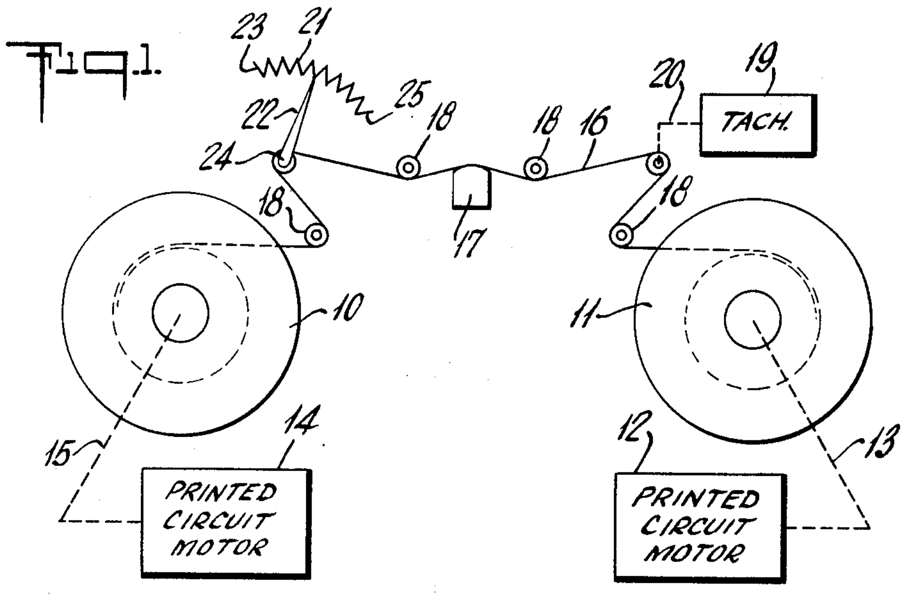
FIG. 1 is a diagrammatic illustration of a reel-to-reel information tape storage apparatus showing the various component parts in operative relationship with each other.

Referring now to FIG. 1 of the drawings, while any desired pattern, or arrangement, may be selected for the two information tape storage reels 10 and 11, they are depicted in this illustration in side by side, spaced-apart horizontally, manner. For the purposes of this description, reel 10 will be referred to as the supply reel and reel 11 as the take-up reel, for tape motion from left to right, although the apparatus will operate effectively with tape movement from right to left.

Tape motion is obtained by means of a single turn motor, also called a low inertia motor or a printed circuit motor 12, connected to the shaft of the reel 11, as indicated by the broken line 13. While the motor 12 drives the reel 11 to draw tape from the supply reel 10, the reel 10 is turned by a motor 14 connected to the shaft of the reel 10, as illustrated by the broken line 15. The reel 10 is turned at a speed that is continuously adjusted to maintain tape tension at a desired value.

Continuous control of tape tension is obtained from a potentiometer 21 that is connected in the drive circuit (not shown) for the motor 14. The movable contact 22 of the potentiometer 21 is urged in a direction to move it toward the end 23 by a suitable biasing means, such as a spring, and this force is balanced and offset by the tension in the tape 16 that passes around a roller 24.

Thus, as tape tension decreases, the contact 22 moves toward the end 23, and conversely, an increase in tape tension will move the contact 22 toward the end 25. Accordingly, changes in tape tension are translated immediately into electrical terms that may be utilized by one skilled in the art in a variety of ways to automatically adjust or modify any motor drive circuit. For example, as tape tension increases, the contact 22 is moved toward the end 25 by an amount that is proportional to the increase in tension, and the motor 14 will be speeded up by an amount sufficient to restore the contact 22 to its preset, balanced position and the tape tension to its desired value.

An adjustment in the desired value of tape tension may be obtained in any number of ways. As an illustration, an adjustment may be placed on the biasing means for the movable contact 22 so that it will be in a different position of balance at a different value of tape tension. Alternatively, a manually adjustable resistor may be connected electrically with the potentiometer 21 to alter the total impedance that is reflected in the drive circuit for the motor 14. If the roller 24 is supported on a pivotable arm or lever, an adjustment in the position of its fulcrum would be still another way of accomplishing the same result.

The information bearing tape is identified generally by the reference numeral 16, and it may be any of the well known forms, such as magnetic or perforated. As the tape 16 is moved from the reel 10 directly to the tape-up reel 11, it is guided in information transferring relationship past a station 17 by any suitable means, such as tape guide troughs, guide posts or rollers, or combinations of these, illustrated by the numeral 18.

A continuous measure of tape speed is obtained from the voltage generated by a tachometer 19 having a shaft, indicated by the broken line 20, that is rotatably connected with the tape 16.

Figure 2:
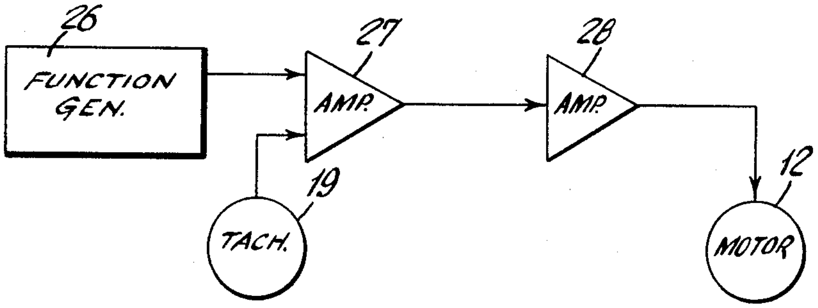
FIG. 2 is a circuit diagram of the tape speed controls, illustrating in block form respective component parts.

Referring now to FIG. 2 of the drawings, a function generator 26 provides a source of sawtooth, or ramp, signals connected to one of two input terminals of an operational amplifier 27. An operational amplifier is well known in the art as being an amplifier responsive to a predetermined arrangement or form of input signals; in the instant case, to the presence of two input signals. The voltage developed by the tachometer 19 is the second signal input to the amplifier 27, which is responsive to the difference between the two input signals.

The output of the operational amplifier 27 is the amplified difference between the sawtooth, or ramp, signal from the function generator 26 and the signal from the tachometer 19. This output is fed into a power amplifier 28 to maintain a constant tape speed during all operational and load conditions by causing the proper voltage to be applied to the take-up reel motor at all times.

It should be noted particularly that all tape motion is controlled by the tachometer 19 and by the take-up reel motor 12. The supply reel motor is a slave that adds or removes tape as the position of the movable contact 22 dictates. The maximum speed of the tape is a function of (1) the worst case system inertias, (2) the torque characteristics of the take-up reel motor, and (3) the requirements for starting and stopping the tape in a predetermined distance.

High speed rewind is a special case of reverse operation with the reference signal being changed to a different slope and a higher voltage. This will cause the take-up reel motor to run at a faster-than-normal reverse speed. An example of this new slope is one which is less steep and the voltage applied is at a higher value than that applied during forward runs. It should be emphasized that this is a rewind situation and not just reverse operation.

For example, in FIG. 3 of the drawings, curve A shows that in time (*a*), the driving voltage has increased to full magnitude and will continue within approximately 2 percent until the end of its programed run (*b*), at which point, if the program so specifies, the driving voltage will reduce the motor speed to stop within the time interval (*c*).

In most computer situations, the tape apparatus is called upon to run in forward and reverse directions repeatedly. Such a normal reverse run is illustrated by the curve B, and it should be observed that this is distinguished from a high speed rewind situation.

In FIG. 4 there is shown a front panel of a tape apparatus with the respective component parts arranged and interconnected more in keeping with the presently preferred form of the invention, it being understood, however, that this is in no way limiting on the scope of the present invention. The claims should be looked to for a definition of the scope of the invention.

It should be noted particularly that counter or back e.m.f. is not used to control speed, but rather, the system of the present invention utilizes the output voltage generated by the tachometer. In the past, systems have been suggested to use back e.m.f. of some motor as an adjusting feature for a motor control circuit. However, such back e.m.f. includes the IR drop of the armature windings and brushes and the armature voltage, and this has made such motor control circuits unsuitable for the higher accuracy required in the computer art.

For example, such prior motor control circuits use a resistance in series with the armature to provide a signal that is proportional to the armature current to, thus, compensate for changes in the IR drop. While this may be sufficiently effective for many purposes, it will still be apparent that the desired signal is inaccurate because compensation cannot be obtained completely by such means. At low speeds, back e.m.f. is low, and the IR drop represents a larger proportion of the signal.

Now, it can be appreciated more readily that a system in accordance with the present invention is effective to control the motion of a tape moving in a controlled manner between reels of continuously varying radii and inertias. Obviously, during start and stop operations, as the reel diameter and, hence, the inertia change, the distance of tape movement in a given time interval would vary if the motor were to be accelerated or decelerated with a constant current or voltage source.

However, a system utilizing the principles of the present invention obtains uniform tape movement even with continuously varying reel radii and inertia.

The above description is of a presently preferred embodiment of the invention and variations and modifications may be made without departing from the scope of the invention which is set forth in the claims appended hereto.

What is claimed is:

1. In a reel-to-reel information tape storage system, tape transport apparatus comprising: tape supply means, a tape take-up reel supported rotatably and spaced from said supply means, an information processing station interposed between said supply means and said take-up reel, at least one tape guide means between said information processing station and said take-up reel to direct the tape past the information processing station in information transferring relationship and causing the tape to be moved to said take-up reel from said information processing station without intervening tape loop storage means or tape driving means, a motor coupled to said tape take-up reel to rotate the reel at controllably different angular velocities, sensing means to generate a speed signal representative of the speed of the tape and control means including a source of predetermined ascending and descending ramp waveform signals and means for comparing said speed signal with one of said ramp waveform signals and causing said motor speed to increase or decrease as necessary to make the rate of change of tape speed conform to said ramp waveform signal, thereby controlling the acceleration of said tape and said take-up reel.

2. A transport apparatus as set forth in claim 1 wherein said supply means includes a second motor, a tape supply reel coupled to said second motor, sensing means mounted to be responsive to changes in tension in the tape directed by said tape guide means, and means for controlling said motor speed at least partially in response to said sensing means.

3. A tape transport apparatus as set forth in claim 1 wherein said control means includes a tachometer to develop a voltage indicative of tape speed.

* * * * *